(12) United States Patent  (10) Patent No.: US 8,432,647 B2
Knott et al.  (45) Date of Patent: Apr. 30, 2013

(54) POWER DISTRIBUTION ARRANGEMENT

(75) Inventors: Arnold Knott, Hundersdorf (DE); Daniel Schmidt, Regensburg (DE); Stefan Zuckmantel, Neufahrn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 77 days.

(21) Appl. No.: 12/512,648

(22) Filed: Jul. 30, 2009

(65) Prior Publication Data
US 2010/0027169 A1 Feb. 4, 2010

(30) Foreign Application Priority Data

Jul. 30, 2008 (EP) .................................. 08013706

(51) Int. Cl.
*H02H 7/00* (2006.01)
(52) U.S. Cl.
USPC ............................................................. 361/18
(58) Field of Classification Search .................. 361/18, 361/62, 63, 64, 93.9, 93.1; 307/11, 31, 34, 307/35, 38, 39
See application file for complete search history.

(56) References Cited

U.S. PATENT DOCUMENTS

| | | | | |
|---|---|---|---|---|
| 4,471,232 A * | 9/1984 | Peddie et al. | ................... | 307/35 |
| 4,882,501 A * | 11/1989 | Konig et al. | ................... | 307/11 |
| 5,254,937 A * | 10/1993 | Mizoguchi | ................... | 323/283 |
| 6,144,194 A * | 11/2000 | Varga | ............................. | 323/285 |
| 6,914,411 B2 * | 7/2005 | Couch et al. | ................... | 320/101 |
| 2005/0289373 A1* | 12/2005 | Chapuis et al. | ............... | 713/300 |
| 2006/0287838 A1* | 12/2006 | Qi et al. | .......................... | 702/57 |
| 2007/0255460 A1* | 11/2007 | Lopata | .......................... | 700/293 |

FOREIGN PATENT DOCUMENTS

| FR | 2788381 | 7/2000 |
|---|---|---|
| FR | 2875651 | 3/2006 |
| JP | 62152368 | 7/1987 |

OTHER PUBLICATIONS

Billings, "Switchmode Power Supply Handbook", McGraw Hill, 11 West 19 Street, New York, NY 10011, 1999, Chapter 7.

* cited by examiner

*Primary Examiner* — Stephen W Jackson
(74) *Attorney, Agent, or Firm* — O'Shea Getz P.C.

(57) ABSTRACT

An arrangement and a method for distributing power supplied by a power source to two or more of loads (e.g., electrical vehicular systems) is disclosed, where a representation of the power taken by a particular one of the loads from the source is measured. The measured representation of the amount of power taken from the source by the particular one of the loads is compared to a threshold to provide an overload signal in the event the representation exceeds the threshold. Control signals dependant on the occurring of the overload signal are provided such that the control signal decreases the output power of the power circuit in case the overload signal occurs.

22 Claims, 4 Drawing Sheets

POWER DISTRIBUTION ARRANGEMENT

CLAIM OF PRIORITY

This patent application claims priority to European Patent Application serial number 08 013 706.0 filed on Jul. 30, 2008, which is hereby incorporated by reference in its entirety.

FIELD OF TECHNOLOGY

The present invention relates to the field of a power distribution arrangement to connect a multiplicity of loads to a power source, and a method of distributing power from a power source to a multiplicity of loads.

RELATED ART

Electrical power sources are by nature limited to a finite amount of power they can deliver. Connecting multiple loads to a power source may lead to overload situations where the power demand from the loads exceeds the maximum power that can be supplied by the source. One such power source may be, for example, the power system of a vehicle or aircraft. In this case, the source is established by one or more generators and batteries. The loads in such a vehicle may include motors, actuators, heating, lighting, and electronics. Depending on the situation different combinations of loads are applied to the power source. Selecting a power source for a possible maximum load would be uneconomic and environmentally unfriendly. Otherwise the above mentioned overload situations may occur.

In particular, when taking into account loads at extreme temperatures or loads with frequently changing power demands the source may be overloaded. In the case of aircraft and automotive applications, safety equipment is more important than comfort equipment. Comfort equipment like window heating, seat heating, air condition or entertainment equipment requires a lot of power from the power source, which may cause the source to be operated over its limit. Therefore, it is necessary to prioritize the loads to ensure operation of the more important equipment. Some of the above mentioned components regulate their output power to the desired level and therefore maintain a constant power demand from their source, even where the source is already saturated. Some of those loads may increase their input currents in case of a decreasing supply voltage such that their output power and, accordingly, their input power remains constant. In critical situations other more important components (e.g., safety equipment) might suffer from this constant power demand while the source is already at its limits. In this case, it is highly desirable to reduce the power of the comfort equipment for safety reasons.

Voltage sources are known that regulate the output current and limit it to a maximum value, for example, at turn on of power sinks such as power supplies. Other sources are connected to each other by a control channel to adapt the current limit. However, adaptation is limited by the transmission speed of the control channel. The known arrangements do not respond sufficiently fast to input current transients under both, normal or start-up conditions. In contrast, safety equipment is usually built in the hardware to take out any risk of software crashes and to enable the maximum speed of reaction to alerts. Therefore, there is a need for an input power limiting arrangement for limiting power over a wide frequency range or a short period of time.

SUMMARY OF THE INVENTION

According to one aspect of the invention, a power distribution system includes an input connected to a power source, two or more outputs, each output connected to one of a plurality of loads, and at least one power limiting unit connected between the input and one of the outputs is provided. The power limiting unit includes a power sensor, a power circuit, a comparison unit, and a control unit. The power sensor is connected between the input and the particular one of the outputs, and to measures a representation of the power supplied by the source to the respective load connected to the particular one of the outputs. The power circuit is connected in series to the power sensor, and supplies a regulated electrical output to a respective one of the loads. The power circuit includes a control element that receives a control signal. The comparison unit is coupled to the power sensor to receive the measured representation of the power supplied to the particular one of the outputs, and compare the measured representation to a threshold for providing an overload signal in case the measured representation exceeds the threshold. The control unit is connected to the comparison unit for receiving the overload signal and to the power circuit for providing the control signal and for limiting the control signal to a given value in case the overload signal is received.

According to another aspect of the invention, a power limiting unit for coupling a power source to at least one electrical vehicular system is provided. The power limiting unit includes a power sensor, a comparator, a controller and a power circuit. The power sensor measures current and/or voltage supplied to the vehicular system from the power source, and provides a measurement signal indicative thereof. The comparator receives and compares the measurement signal and a threshold signal, and provides an overload signal where the measurement signal is greater than the threshold signal. The controller receives the overload signal and provides a control signal associated with a command to draw less power. The power circuit includes a control element that receives the control signal. The power circuit regulates the supplied current and/or voltage to the vehicular system in response to the control signal.

According to another aspect of the invention, a power distribution system for coupling a power source to a plurality of electrical vehicular systems which includes first and second vehicular systems is provided. The power distribution system includes a power management unit and a plurality of power limiting units. The power management unit provides a threshold signal. Each power limiting unit includes a power sensor, a comparator, a controller, and a power circuit. The power sensor measures electrical power supplied to one of the vehicular systems from the power source, and provides a measurement signal indicative thereof. The comparator receives and compares the measurement signal and the threshold signal, and provides an overload signal when the measurement signal is greater than the threshold signal. The controller receives the overload signal and provides a control signal. The power circuit includes a control element that receives the control signal. The power circuit regulates the supplied current and/or voltage to the one of the vehicular systems in response to the control signal.

According to still another aspect of the invention, a method for distributing power supplied by a power source to a plurality of electrical vehicular systems is provided. The method includes (i) measuring a representation of the power taken by a particular one of the vehicular systems from the source, (ii) regulating an output power dependant on a control signal, (iii) comparing the measured representation of the power taken from the source by the particular one of the vehicular systems to a threshold for providing an overload signal where the measured representation exceeds the threshold, and (iv) providing control signals dependant on the occurring of the overload signal such that the control signal decreases the output power of the power circuit where the overload signal occurs.

DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
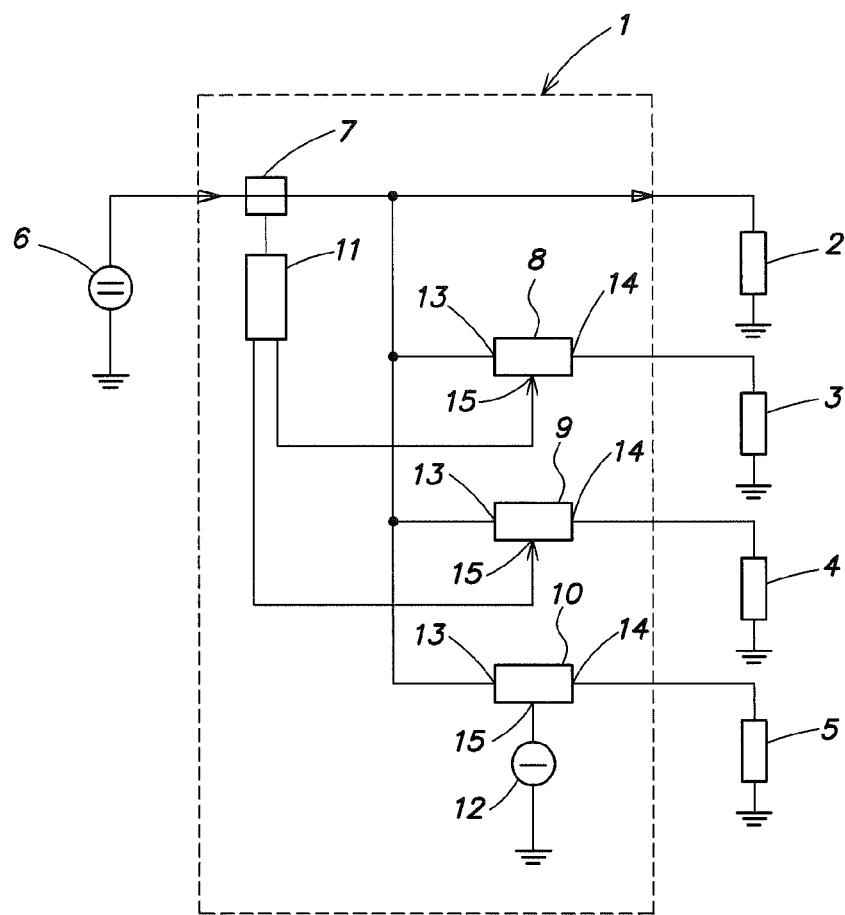
FIG. 1 is a block diagram of an example of a novel power distribution arrangement.

Referring to FIG. 1, a power distribution system 1 for coupling a plurality of loads, e.g., 2, 3, 4, 5 to a power source 6 comprises a current sensor 7, a plurality of power limiting units, e.g., 8, 9, 10, a total-power management unit 11, and a reference voltage source 12. The loads may be any kind of load such as ohmic, inductive, and capacitive loads as well as combinations thereof. The loads may be established by, e.g., motors, actuators, heating, lighting, electronics, or the like. The power source 6 may be a power net and comprise one or more power generators and/or one or more batteries that are not shown for the sake of simplicity. The power source may be, e.g., a current source or a voltage source. The power limiting units 8, 9, 10 limit the power consumed by its respective load to a certain amount, by decreasing the voltage and/or the current supplied to its associated load, accordingly.

Each of the power limiting units 8, 9, 10 includes a power input 13 coupled to the source 6 through the power sensor 7, a power output 14 connected to the respective load, and a threshold input 15 to receive a threshold representing a value to which the amount of power is to be limited. The threshold inputs 15 of the power limiting units 8 and 9 are connected to the total-power management unit 11 that provides the respective thresholds depending on the total power required by the loads 2, 3, 4, and 5. The power limiting unit 10 receives a fixed threshold from the reference voltage source 12. In the present example, voltages are supplied to the threshold inputs 15 of the power limiting units 8, 9, 10 to define the respective thresholds, but any other kind of signal is applicable as well.

In the present example, the highest priority is assigned to the first load 2, such that it is supplied with all the power it requires as far as this amount of power can be provided by the source 6. Second highest priority is assigned to the fourth load 5 that is supplied with all the power it requires provided this amount of power is under a fixed limit set by the threshold and the source 6 is able to deliver this amount of power. The second and third loads 3 and 4 have lowest priority and are supplied with each a certain share of the amount of power that is not required by the first and fourth loads 2 and 5, respectively, and that evaluated by the total-power management unit 11 such that the actual power consumed by the loads 2-5 is measured by a power sensor, in the present example the current sensor 7 but also may be a voltage sensor under certain conditions, and compared to the maximum power that can be provided by the source 6. The difference between the actual and the maximum power is shared in a fixed or dynamically controlled ratio by the second and third loads 3 and 4.

Figure 2:
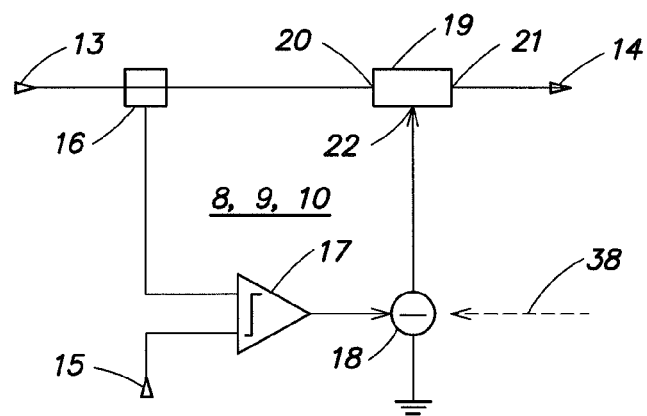
FIG. 2 is a block diagram of an exemplary power limiting unit for use in the power distribution arrangement of FIG. 1.

FIG. 2 illustrates the power limiting unit 10 for use in the power distribution system 1 of FIG. 1. The current sensor 7 (FIG. 1) is connected to the input terminal 13 and measures the amount of current supplied to the respective load connected to power output terminal 14 and provides a representation thereof, e.g., a voltage that is proportional to the current flowing into the load. This voltage is supplied to a comparator 17, which compares the voltage representing the load current and, accordingly, the power consumed by the load, to a reference voltage that is applied to the threshold input 15 and that forms a power threshold.

A control unit, in the present example a controllable voltage source 18, is connected to the comparator 17, such that the reference voltage provided by the voltage source 18 is dependent on the current measured by the current sensor 16. The reference voltage provided by the voltage source 18 is supplied as a control signal to a power circuit 19 that comprises a power input terminal 20, a power output terminal 21, and a control signal input 22. The power circuit 19 may be, for example, an AC-DC converter, a power factor controller, a pulse width modulator or, as discussed below with reference to FIGS. 4, 5, and 6, a linear voltage regulator, a DC-DC converter or switch-mode power amplifier, respectively.

Thus, a representation of the power consumed by the each of the power limiting circuits 8, 9 or 10 together with one of the loads 3, 4, or 5 is measured by the current sensor 16. The power circuit 19 regulates its output power dependant on the control signal provided by the voltage source 18. The control signal depends on an overload signal provided by the comparator 17 to decrease the output power of the power circuit 19 in case the overload signal occurs. The measured representation of the power supplied by the source 6 to the particular load is compared to a threshold and the overload signal is provided in case the representation succeeds/exceeds the threshold.

Accordingly, the power circuit 19 is connected in series to the current sensor 16, serving as a power sensor, and supplies a regulated output voltage or a regulated output current or both to the respective load. The power circuit 19 comprises a control element such as the transistors 26, 36, 37, 39 in the power circuits shown in FIGS. 3, 4, and 5, that receives a control signal. The comparator 17 is coupled to the current sensor 16 and receives a voltage as a measured representation of the power supplied to the particular one of the outputs and compares this representation to a threshold voltage for providing an overload signal in case the representation succeeds the threshold. The controlled voltage source 18 limits the control signal to a given value, e.g., a certain voltage when it receives the overload signal from the comparison unit. The voltage provided by the controllable voltage source 18 may be such that the drive transistor(s) is switched off or clamped to provide a maximum output voltage or current when the overload signal occurs and may be adjusted by a signal 38.

Figure 3:
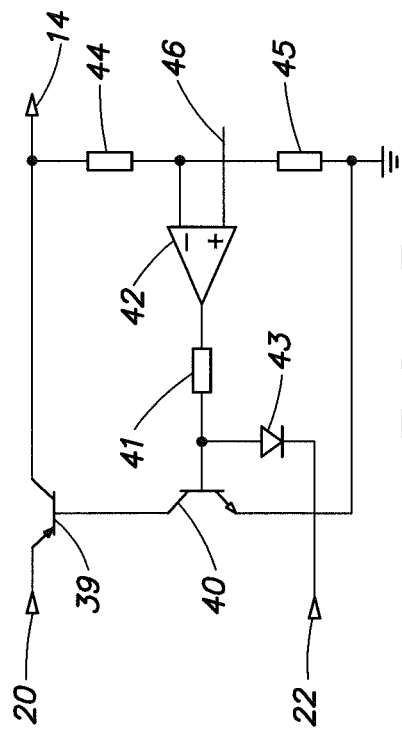
FIG. 3 is a block diagram of a linear voltage regulator for use in the power limiting unit of FIG. 2.

FIG. 3 is a block diagram of the power limiting unit 19 of FIG. 2. The power input terminal 20 is connected to the emitter of the transistor 39, whose collector is connected to the power output terminal 14. The voltage at the power output terminal 14 is fed back via a voltage divider established by resistors 44, 45, a differential amplifier 42 connected to a reference voltage 46, a resistor 41 in the output branch of the amplifier 42, and a npn bipolar transistor 40 whose emitter collector path is connected between the base of the transistor 39 and ground. The base of the transistor 40 is further connected to the voltage source 18 through a diode 43 and the terminal 22. The voltages to be provided by the voltage source 18 in the event an overload signal occurs or not, are such that it does not influence the voltage provided by the amplifier 42 when no overload is detected. However, in an overload situation, it is such that the voltage at the base of the transistor 40 is limited to a value that that the transistor 39 is switched off or clamped.

Figure 4:
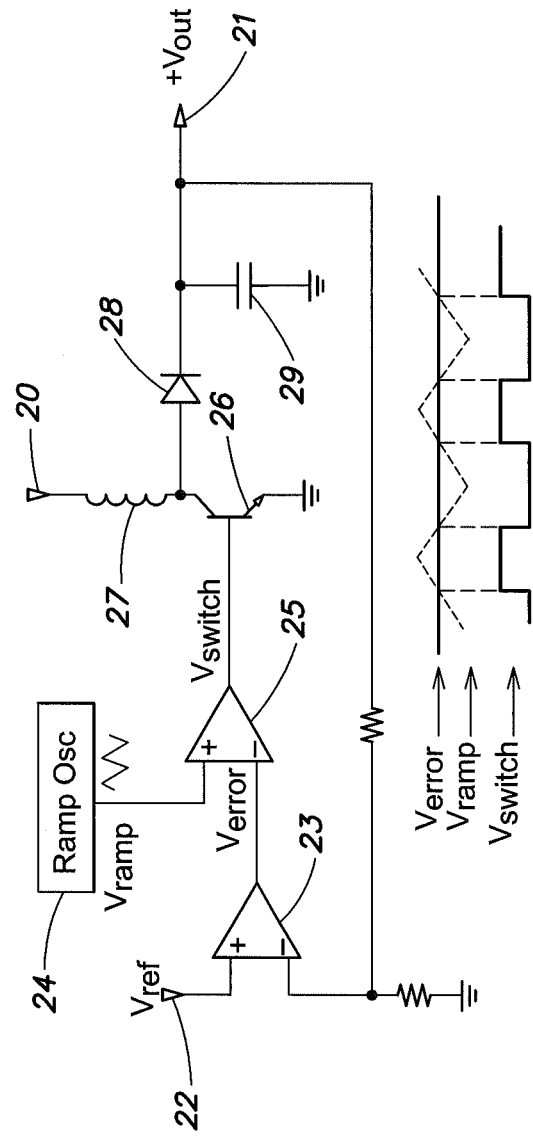
FIG. 4 is a block diagram of a DC-DC converter as a power circuit for use in the power limiting unit of FIG. 2.

FIG. 4 is a block diagram of an exemplary DC-DC converter establishing a switch-mode power circuit 19 for use in the power limiting unit of FIG. 2. Such converter may be of the boost, buck, or inverter (flyback), push-pull, half-bridge, full-bridge, Sepic type or a combination thereof. A common control method, as used in the power circuit 19 of FIG. 4, uses pulse-width modulation (PWM). In this method, a sample of an output voltage $V_{OUT}$ is taken and subtracted, in a subtractor 23, from a reference voltage $V_{REF}$ at the reference terminal 22 to generate an error signal $V_{ERROR}$. This error signal $V_{ERROR}$ is compared to a ramp signal $V_{RAMP}$ received from a ramp oscillator 24 (e.g., a sawtooth oscillator). The comparison takes place in a comparator 25 outputting a digital signal $V_{SWITCH}$ that controls the power switch 26 switching an inductance 27. The alternating voltage at the junction of the switch 26 and the inductance 27 is rectified by a diode 28 and a capacitor 29 to generate the output voltage $V_{OUT}$. When the output voltage $V_{OUT}$ changes, the error signal $V_{ERROR}$ also changes and thus causes the threshold of the comparator 25 established by the error signal $V_{ERROR}$ to change. Consequently, the output pulse width (PWM) changes. This duty cycle change then moves the output voltage to reduce the error signal to zero, thus completing the control loop. Changing the duty cycle controls the steady-state output with respect to the input voltage. This is a key concept governing all inductor-based switching circuits.

Figure 5:
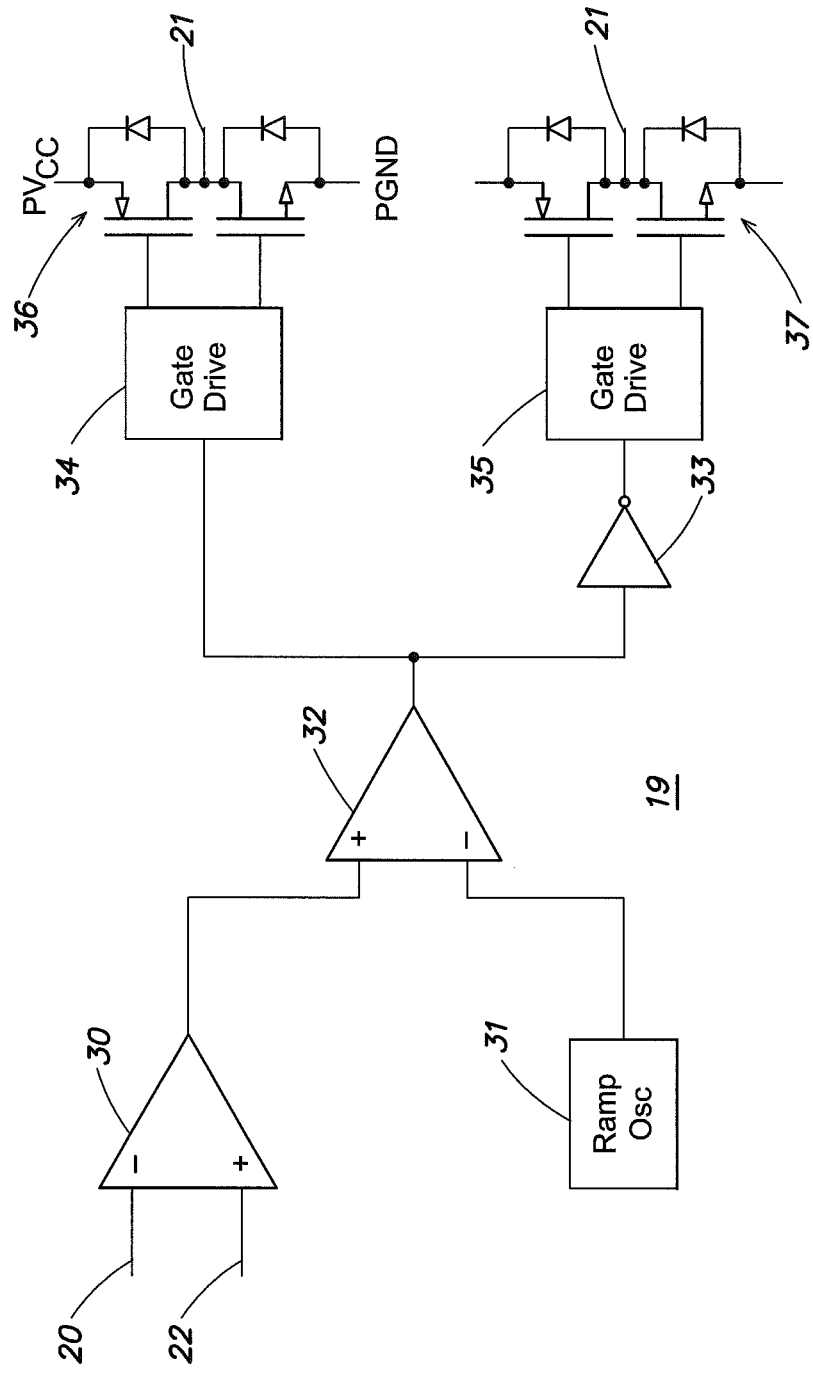
FIG. 5 is a block diagram of a switch-mode audio amplifier as a power circuit for use in the power limiting unit of FIG. 2.

FIG. 5 is a block diagram of a switch-mode audio amplifier establishing a power circuit for use in the power limiting unit of FIG. 2. A switch-mode audio amplifier comprises an input preamplifier 30, a ramp oscillator 31 (e.g., a sawtooth oscillator), a comparator 32, and a H-bridge comprising an inverter 33, two MOSFET drivers 34 and 35, and two output stages 36 and 37, each having two MOSFET power transistors. The comparator 32 samples a signal received from the preamplifier 30, with the oscillator frequency determining the duration of the sampling period. Thus, the oscillator frequency is an important factor in the overall performance of a Class D amplifier. The preamplifier 30 is supplied with the input signal at the terminal 20 and the reference signal at the terminal 22. The comparator 32 outputs a pulse-width modulated square wave that drives the H-bridge. The H-bridge then outputs the square wave differentially, and provides a low-impedance source to, e.g., a LC filter and a loudspeaker (both not shown) as load.

The current sensors 7, 16 (FIGS. 1 and 2) in the above examples may be any known type, e.g., current sensors comprising Hall elements, inductive sensors, resistive elements (shunts) and the like. The output of such current sensors is usually a voltage that is easier to handle by the circuitry connected downstream of the current sensor. The measured current represents the power consumed by the respective load(s) assuming that the voltage of the source 6 is essentially constant. As the voltage output by the current sensor is proportional to the current to be measured, the voltage is a representation of the power consumed.

The measured power consumption is compared to an adjustable maximum power threshold represented by the threshold voltage at the terminal 15, in the following comparator 17. The maximum power threshold may be adjusted under control of the total-power management unit 11 using adequate algorithms. When an overload situation is detected by the comparator 17 a given stable reference voltage is applied to the power circuit 19 by the control unit 18. This reference voltage 22 is equal or lower than the one in the regular mode (non-overload situation). In some cases the overload reference voltage may be zero so that the power circuit 19 is switched off. The reference voltage may also be linked to the threshold voltage in a certain manner and, accordingly, be controlled by the total-power management unit 11. This ensures both slow software and fast hardware control of the limiting functionality and transfers the signal into the dynamics of the control of the power circuit 19.

In the examples illustrated above, the power sensor is connected upstream of the power circuit, i.e., between the input terminal and the power circuit, so that the regulation loop of the power circuit does not include the power sensor and the comparison unit resulting in a very fast response time.

Major advantages of the novel arrangement and method include a fast response time to a given maximum input energy level; a software independent energy control that better fulfils safety requirements; an input limitation also for high frequent energy demands; and a fast recovery time from overload situations.

The fast limiting function is activated by an excessive input current being above the specified threshold. The maximum speed of the limiting function depends on the delay of the comparison to the threshold.

Figure 6:
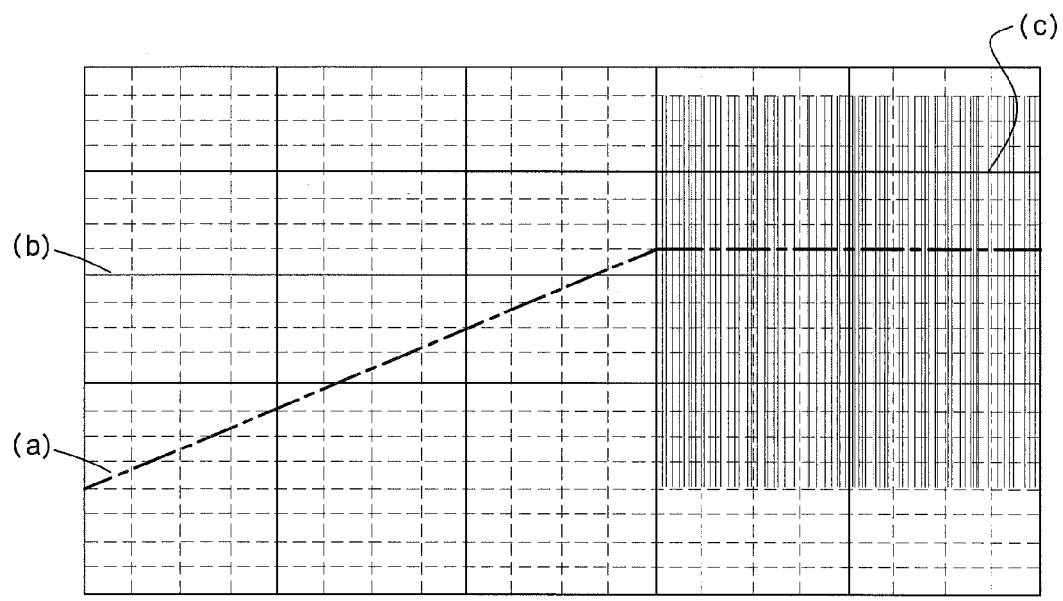
FIG. 6 is a diagram illustrating the results of simulations of the power distribution arrangement shown in FIG. 1.

As can be seen from FIG. 6, the set point is never exceeded, although the voltage source is heavily overloaded. Its simulation results are shown in FIG. 6 where the curve (a) is a representation of the actual input current, line (b) represents the adjusted maximum current reference, and curve (c) shows the reference path to the of the power circuit 19 to control the power consumed.

Figure 7:
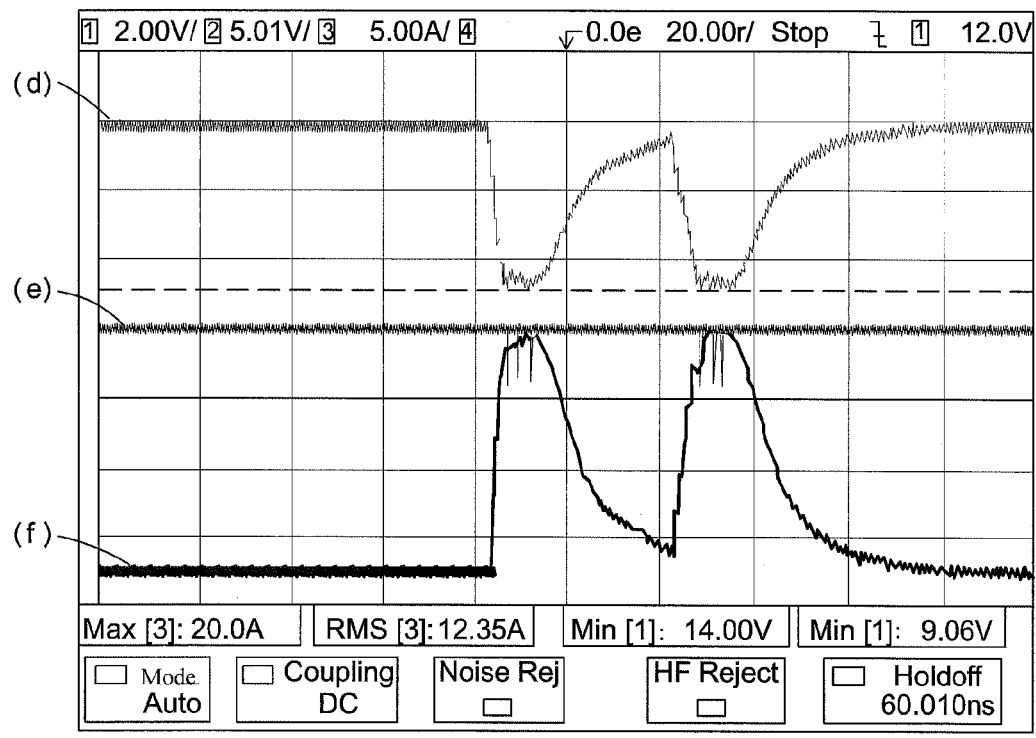
FIG. 7 is a diagram illustrating the results of measurements of the power distribution arrangement shown in FIG. 1.

Measurements on a prototype verified the simulations and are shown in FIG. 7 where curve (d) depicts the voltage of an overloaded voltage source, curve (f) a current at a peak load demand, curve (e) the response of the control unit thereto.

Referring again to FIG. 1, at least one of the loads 3, 4, and 5 may be a loudspeaker. In particular, the loudspeaker may be part of a motor vehicle infotainment system. The respective power circuits 8, 9, and 10 may be of the type shown in FIG. 2 having power circuits 19 as illustrated in FIG. 3 or 4 and a switch-mode audio amplifier as illustrated in FIG. 5 connected downstream thereof. The respective reference voltages 22 of the power circuit including in a cascaded manner the voltage regulator (shown in FIG. 3 or 4) and the amplifier (shown in FIG. 5) are controlled simultaneously by the comparator 17 so that, e.g., both the power circuit and the load are switched off simultaneously and, thus, problems occurring with different load-source situations are avoided.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

What is claimed is:

1. A power distribution system comprising an input connected to a power source, a plurality of outputs, each output connected to one of a plurality of loads, and at least one power limiting unit connected between the input and one of the outputs, the power limiting unit comprising:
   a power sensor connected between the input and each of the plurality of outputs, that measures the power supplied by the source to the plurality of loads;
   a plurality of power circuits each connected in series to the power sensor, and supplies a regulated electrical output to a respective one of the plurality of loads, each of the plurality of power circuits comprising a control element that receives a control signal;
   a comparison unit coupled to the power sensor to receive a measured representation of the power supplied to a particular one of the plurality of outputs, and compare the measured representation to a threshold for providing an overload signal in case the measured representation exceeds the threshold; and
   a control unit connected to the comparison unit for receiving the overload signal and each of the plurality of the power circuits for providing the uniquely associated control signal and limiting the associated control signal to a given value in case the overload signal is received.

2. The arrangement of claim 1, where the power sensor comprises a current sensor and the measured representation of the power supplied to the load connected to the particular one of the outputs is a voltage that is proportional to the current measured.

3. The arrangement of claim 2, where the comparison unit compares the voltage representing the current measured to a threshold voltage.

4. The arrangement of claim 1, where the control signal provided to the power circuit is a reference voltage.

5. The arrangement of claim 4, where, in case the measured representation exceeds the threshold, the value of the control signal, is lower than in a non-overload mode of operation.

6. The arrangement of claim 1, where the power circuit comprises a DC-DC converter.

7. The arrangement of claim 1, where the power circuit comprises a switch-mode power amplifier.

8. The arrangement of claim 1, where the regulated electrical output of the power circuit is set by the control signal in case of an occurrence of an overload signal to a value below the power represented by the threshold.

9. The arrangement of claim 1, where at least two power limiting units are connected between the input and each of the at least two power limiting units uniquely therewith; each power limiting unit having a particular threshold corresponding to characteristics of the respective load and a priority assigned to the load.

10. The arrangement of claim 1, further comprising a power management unit that provides the threshold to the power limiting units.

11. The arrangement of claim 10, where the power management unit evaluates the total power supplied by the power source and sets the thresholds according to the priority and the power available.

12. The arrangement of claim 9, where the thresholds are fixed.

13. The arrangement of claim 1, where the control signal is such that the control element is switched off.

14. The arrangement of claim 1, where the power sensor is connected electrically upstream of the power circuit.

15. A method for distributing power supplied by a power source to a plurality of electrical vehicular systems, comprising:
   measuring a representation of the power taken by the plurality of electrical vehicular systems from the source and providing a measured power signal;
   regulating an output power dependant on a plurality of control signals;
   comparing the measured power signal to a threshold for providing an overload signal when the measured representation exceeds the threshold; and
   providing the plurality of control signals dependant on the occurring of the overload signal such that the control signals selectively decrease the output power of at least one of the plurality of power circuits when the overload signal occurs.

16. A power limiting unit for coupling a power source to a plurality of electrical vehicular systems, the power limiting unit comprising:
   a power sensor that measures the total current and/or voltage supplied to the plurality of the electrical vehicular systems from the power source, and provides a measurement signal indicative thereof;
   a comparator that receives and compares the measurement signal and a threshold signal, and provides an overload signal when the measurement signal is greater than the threshold signal;
   a controller that receives the overload signal and provides a control signal associated with a command for less electrical power; and
   a power circuit that includes a control element that receives the control signal, which power circuit regulates the supplied current and/or voltage to the plurality of the vehicular system in response to the control signal.

17. The power limiting unit of claim 16, where the power circuit comprises a DC-DC converter.

18. The power limiting unit of claim 16, where the power circuit comprises a switch-mode power amplifier.

19. The power limiting unit of claim 16, where the power circuit is configured to maintain the supplied current and/or voltage below the threshold signal where the measurement signal is greater than the threshold signal.

20. A system for distributing power from a power source to a plurality of loads, the system comprising:
   a first sensor that provides a first sensor signal indicative of the power distributed by the power source to the plurality of loads;
   a power management unit that provides a threshold based on the first sensor signal; and
   a plurality of power limiting units that limit the power respectively distributed to the plurality of loads, where each of the plurality of power limiting units is connected to and downstream of the power sensor, and a first of the plurality of power limiting units comprises
   a second sensor that provides a second sensor signal indicative of the power distributed to a first of the plurality of loads;
   a power circuit connected to and downstream of the second sensor, where the power circuit regulates the power distributed to the first of the plurality of loads based on a control signal;
   a comparison unit that receives the threshold and the second sensor signal, and provides an overload signal where the second sensor signal is greater than the threshold; and
   a control unit that provides the control signal in response to receiving the overload signal.

21. A system for distributing power from a power source to a plurality of loads, the system comprising:
- a plurality of power limiting units that limit the power respectively distributed to the plurality of loads, where each of the plurality of power limiting units comprises
  - a sensor that provides a sensor signal indicative of the power distributed to a respective one of the plurality of loads;
  - a power circuit connected to and downstream of the sensor, where the power circuit regulates the power distributed to the first of the plurality of loads based on a control signal; and
  - a control circuit that compares the sensor signal to a threshold, and selectively provides the control signal to the power circuit based on the comparison of the sensor signal to the threshold.

22. The system of claim 21, where the control circuit comprises
- a comparison unit that compares the sensor signal to the threshold, and provides an overload signal where the sensor signal is greater than the threshold; and
- a control unit that provides the control signal in response to receiving the overload signal.

* * * * *